United States Patent
Roness

(10) Patent No.: US 11,555,929 B2
(45) Date of Patent: Jan. 17, 2023

(54) SYSTEM FOR DETERMINING A POSITION ON A GOLF COURSE

(71) Applicant: Bjørn Roness, Torvastad (NO)

(72) Inventor: Bjørn Roness, Torvastad (NO)

(73) Assignee: Bjørn Roness, Torvastad (NO)

( * ) Notice: Subject to any disclaimer, the term of this patent is extended or adjusted under 35 U.S.C. 154(b) by 435 days.

(21) Appl. No.: 16/492,272

(22) PCT Filed: Apr. 6, 2018

(86) PCT No.: PCT/NO2018/050094
§ 371 (c)(1),
(2) Date: Sep. 9, 2019

(87) PCT Pub. No.: WO2018/190724
PCT Pub. Date: Oct. 18, 2018

(65) Prior Publication Data
US 2021/0149008 A1    May 20, 2021

(30) Foreign Application Priority Data
Apr. 12, 2017  (NO) .................................. 20170623

(51) Int. Cl.
*G01S 19/07* (2010.01)
*A63B 57/30* (2015.01)
(Continued)

(52) U.S. Cl.
CPC .......... *G01S 19/072* (2019.08); *A63B 57/357* (2015.10); *G01S 5/0027* (2013.01);
(Continued)

(58) Field of Classification Search
CPC ... A63B 24/0021; A63B 57/357; A63B 69/36; A63B 71/06; A63B 71/0619;
(Continued)

(56) References Cited

U.S. PATENT DOCUMENTS 5,469,175 A * 11/1995 Boman .................... G01S 19/41
  473/409
6,263,279 B1 * 7/2001 Bianco ................. G01C 22/004
  701/461
(Continued)

FOREIGN PATENT DOCUMENTS

EP  0617794 B1 * 12/1992 ........... G01S 19/071
EP  1207405  5/2002
(Continued)

OTHER PUBLICATIONS

Norwegian Search Report for NO 20170623, dated Nov. 11, 2017.
(Continued)

*Primary Examiner* — Stephen R Burgdorf
(74) *Attorney, Agent, or Firm* — Andrus Intellectual Property Law, LLP

(57) ABSTRACT

A system is for determining a position on a golf course. The system has a master unit and at least one slave unit. The master unit and the at least one slave unit are adapted to communicate through a telecommunications network. The master unit comprises a receiver for a satellite navigation system, the receiver being operable at a fixed position on the golf course. The master unit is configured to: obtain a position determined by the receiver; process the displacement between the obtained position and the fixed position; and make the processed displacement available to the at least one slave unit through the telecommunications network. A slave unit then makes use of the processed displacement to improve positions determined by itself.

6 Claims, 4 Drawing Sheets

(51) Int. Cl.
*G01S 5/00* (2006.01)
*G01S 19/51* (2010.01)
*G05D 1/00* (2006.01)
*G05D 1/02* (2020.01)

(52) U.S. Cl.
CPC .............. *G01S 19/07* (2013.01); *G01S 19/51* (2013.01); *G05D 1/0022* (2013.01); *G05D 1/0088* (2013.01); *G05D 1/0212* (2013.01); *G05D 1/0278* (2013.01); *G05D 2201/0208* (2013.01)

(58) Field of Classification Search
CPC ... A63B 71/0669; G01S 5/0027; G01S 19/07; G01S 19/072; G01S 19/19; G01S 19/41; G01S 19/51; G05D 1/0022; G05D 1/0088; G05D 1/0212; G05D 1/0278; G05D 2201/0208; G08B 21/0247; H04B 3/45; H04M 11/045; H04W 4/02; H04W 4/021; H04W 64/00
USPC ...................................... 340/539.13
See application file for complete search history.

(56) References Cited

U.S. PATENT DOCUMENTS

| | | | | |
|---|---|---|---|---|
| 6,278,402 | B1* | 8/2001 | Pippin | G01S 19/074 |
| | | | | 342/357.44 |
| 6,304,211 | B1 | 10/2001 | Boman | |
| 7,358,857 | B1* | 4/2008 | White | G01S 5/0018 |
| | | | | 340/539.13 |
| 8,527,197 | B2 | 9/2013 | Poncelet born Morey | |
| 2002/0027524 | A1 | 3/2002 | Pippin | |
| 2002/0060642 | A1* | 5/2002 | Togasaka | G01S 5/0027 |
| | | | | 701/484 |
| 2003/0103001 | A1* | 6/2003 | Huston | G01S 19/19 |
| | | | | 342/357.57 |
| 2007/0096898 | A1* | 5/2007 | Chou | H04W 4/02 |
| | | | | 340/539.13 |
| 2009/0082139 | A1* | 3/2009 | Hart | A63B 24/0003 |
| | | | | 473/409 |
| 2011/0142099 | A1 | 6/2011 | Poncelt | |
| 2012/0316009 | A1 | 12/2012 | Meadows et al. | |
| 2014/0274155 | A1 | 9/2014 | Langberg | |
| 2014/0370891 | A1* | 12/2014 | Sagayaraj | H04W 4/02 |
| | | | | 455/435.1 |
| 2015/0296707 | A1* | 10/2015 | Fukuda | A01B 69/008 |
| | | | | 701/25 |
| 2017/0087436 | A1 | 3/2017 | Peterson | |
| 2019/0235493 | A1* | 8/2019 | Doane | G08G 1/16 |

FOREIGN PATENT DOCUMENTS

| | | |
|---|---|---|
| GB | 2286696 | 8/1995 |
| KR | 20170017195 | 2/2017 |
| WO | 2008157736 | 12/2008 |
| WO | 2016148989 | 9/2019 |

OTHER PUBLICATIONS

International Search Report for PCT/NO2018/050094, dated May 31, 2018.
Written Opinion for PCT/NO2018/050094, dated May 31, 2018.
Response to the Written Opinion for PCT/NO2018/050094, dated Feb. 5, 2019.
Written Opinion for PCT/NO2018/050094, dated Apr. 3, 2019.
International Preliminary Report on Patentability for PCT/NO2018/050094, dated Jun. 25, 2019.

* cited by examiner

SYSTEM FOR DETERMINING A POSITION ON A GOLF COURSE

CROSS-REFERENCE TO RELATED APPLICATIONS

This application is the U.S. national stage application of International Application PCT/NO2018/050094, filed Apr. 6, 2018, which international application was published on Oct. 18, 2018, as International Publication WO 2018/190724 in the English language. The International Application claims priority of Norwegian Patent Application No. 20170623, filed Apr. 12, 2017. The international application and Norwegian application are both incorporated herein by reference, in entirety.

FIELD

The present invention relates to a system for determining a position on a golf course.

BACKGROUND

A golf course is an area comprising a series of holes, in which the game of golf is played. Typically, a golf course with 18 holes occupies as much as 60 hectares (approximately 150 acres) of land and has an average of 30 hectares (approximately 74 acres) of maintained turf. Determining a position on a golf course is useful in several circumstances. One example is providing an autonomous vehicle to perform a maintenance task on the golf course, such as cutting grass, picking up trash, or removing dew. The ability to determine the current position allows the autonomous vehicle to, for example, process a trajectory, move along an appropriate path on the golf course, or decide which movement to perform next. Another example is a golf player deciding on how to perform a stroke during a round of golf. When making that decision, an important information to consider is the distance from the position of the ball being played to the target hole. The distance can be obtained if the player knows the position of the hole before-hand and is able to determine his/her position on the golf course.

However, there are challenges in determining a position with accuracy on the golf course. A significant error can sabotage the action that is performed based on the determined position. For example, an autonomous lawn mower will require accurate positions to be determined when cutting the grass on a putting green, otherwise the resulting putting green may differ from the planned design. Or the autonomous lawn mower will require accurate positions to be determined when circumventing hazards, such as bunkers or water streams, otherwise it may move into a location that will block it from moving further or even damage it. Another example, is a player selecting an incorrect club when performing a stroke, the selection being performed based on an incorrect determination of his/her position, of the position of the ball, and/or of the position of a hole on the golf course.

A known solution for determining a position on a golf course is a receiver for a satellite navigation system such as the Global Positioning System (GPS), the GLONASS (Globalnaya Navigazionnaya Sputnikovaya Sistema), or the Galileo system. However, in practice it is observed that the determined position will present an error approximately between 5 and 15 meters. With such an error, it is not safe, for example, for an autonomous lawn mower to move on a path that is 3 meters wide. A player will also determine his/her position with a significant error, which renders this solution insufficient in many situations.

SUMMARY

The present invention will now be disclosed.

According to an aspect of the present invention there is provided a system for determining a position on a golf course, the system comprising a master unit and at least one slave unit, wherein each of the master unit and the at least one slave unit comprises a processing unit, a memory, a receiver for a satellite navigation system, and are adapted to communicate through a telecommunications network, wherein the receiver of the master unit is operable at a fixed position on the golf course and the memory of the master unit is configured with the fixed position, wherein the master unit is configured to:
  obtain a position determined by the receiver of the master unit;
  process the displacement between the obtained position and the fixed position; and
  make the processed displacement accessible to the at least one slave unit through the telecommunications network, and
wherein a slave unit is configured to:
  obtain the displacement processed by the master unit through the telecommunications network;
  obtain a position determined by the receiver of the slave unit;
  filter the obtained position based on the obtained displacement.

By providing a master unit with a receiver for a satellite navigation system and by having the receiver to be operable at a known fixed position on the golf course it becomes possible to compare the position determined by the receiver against the fixed position. This allows to process the displacement of the position determined by the receiver, in other words an error. It has been realised that, if the displacement is made available to the at least one slave unit, the latter can then make use of it to improve any position determined therein. Thus, although the system may process the displacement at a fixed location, it still enables the at least one slave unit to improve the determination of its position, even if it changes its position on the golf course.

The configured step of the master unit to process the displacement may comprise processing the difference of latitude and longitude between the obtained position and the fixed position.

The configured step of the slave unit to filter the obtained position based on the obtained displacement may comprise correcting the obtained position based on the inversion of a difference of latitude and longitude processed by the master unit.

The system may comprise a server adapted to communicate through the telecommunications network, the server comprising a database for storing a displacement processed by the master unit, wherein the configured step of the master unit to make the processed displacement accessible to the at least one slave unit through the telecommunications network, comprises:
  communicating the processed displacement to the server through the tele-communications network, and
wherein the configured step of the slave unit to obtain the displacement pro-cessed by the master unit through the telecommunications network, comprises:

communicating with the server through the telecommunications network so as to obtain the processed displacement.

The database of the server may also be for storing at least one filtered position of a slave unit, wherein the slave unit is further configured to communicate the filtered position through the telecommunications network to the server, wherein a second slave unit is configured to:

communicate with the server through the telecommunications network so as to obtain the filtered position of the slave unit;

calculate the distance between the filtered position of the second slave unit and the filtered position of the slave unit.

According to another aspect of the present invention there is provided a golf course comprising the system described above. At least one hole of the golf course may comprise a slave unit.

According to a further aspect of the present invention there is provided a flag for marking the position of a hole on a golf course, the flag comprising a slave unit of the system as described above.

According to a further aspect of the present invention there is provided a portable device for determining a position on a golf course, the portable device comprising a slave unit of the system as described above.

According to a further aspect of the present invention there is provided an autonomous vehicle operable to move on a golf course, comprising a slave unit of the system as described above. The autonomous vehicle may be an autonomous lawn mower.

BRIEF DESCRIPTION OF THE DRAWINGS

Embodiments of the invention will now be described by way of example with reference to the accompanying drawings in which.

DETAILED DESCRIPTION OF THE DRAWINGS

Figure 1:
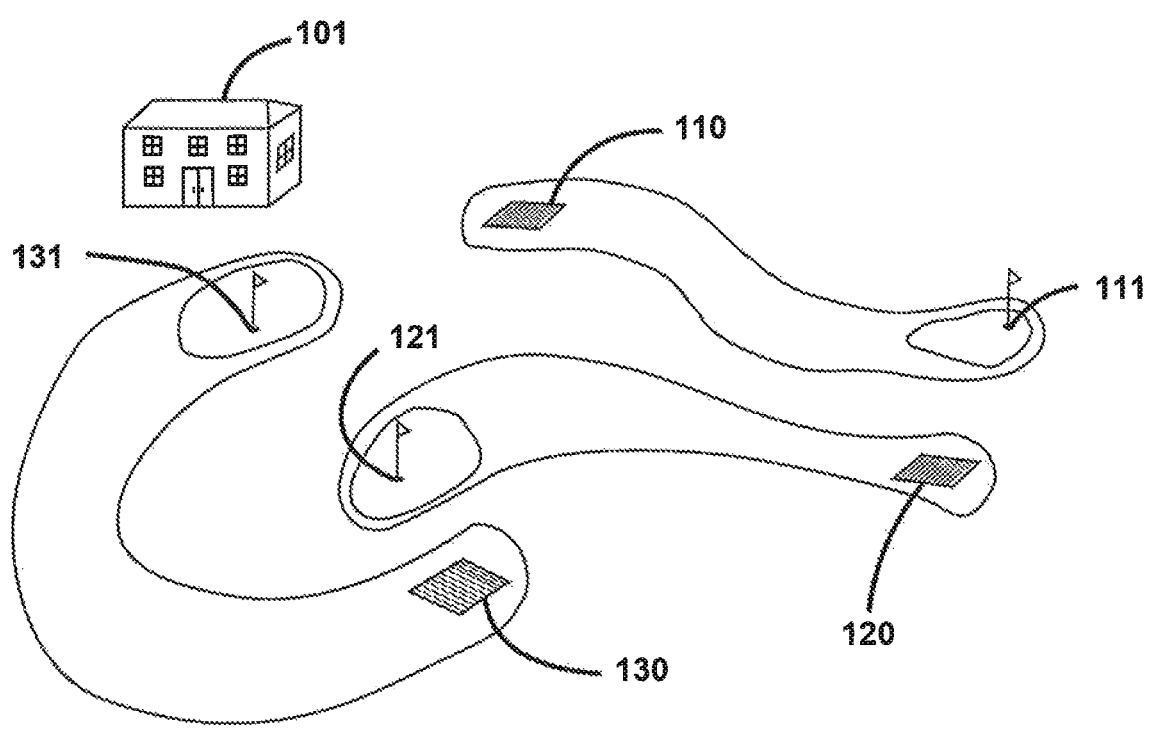
FIG. 1 illustrates a golf course.

FIG. 1 illustrates a golf course in which there is a clubhouse 101 and three holes (111, 121, and 131). Notwithstanding that a golf course typically has a number of holes that is multiple of 9 (due to a round of golf normally consisting of 9 or 18 holes), FIG. 1 includes only three holes for the purpose of simplifying its drawing. Typically, the clubhouse 101 of a golf course serves as an entry point and as a meeting place, providing facilities such as a locker room, a restaurant, or a pro shop. Usually, the golf course is arranged so that the clubhouse 101 is near the start—in FIG. 1 the start is the teeing ground 110—and the end—in FIG. 1 the end is the hole 131—of a sequence of holes. Also, the clubhouse 101 is normally situated at a location with a good visibility to most holes of the golf course.

In the golf course illustrated in FIG. 1, a round of golf consisting of the three holes therein (111, 121, and 131) could be played by starting from the teeing ground 110. A ball would be played from there with successive strokes until it would be at rest within the hole 111. Then, moving to the second teeing ground 120, the ball would be played towards the hole 121. And finally, moving to the third teeing ground 130, the ball would be played towards the hole 131. The player who finishes the three holes with the lowest number of strokes would win.

Figure 2:
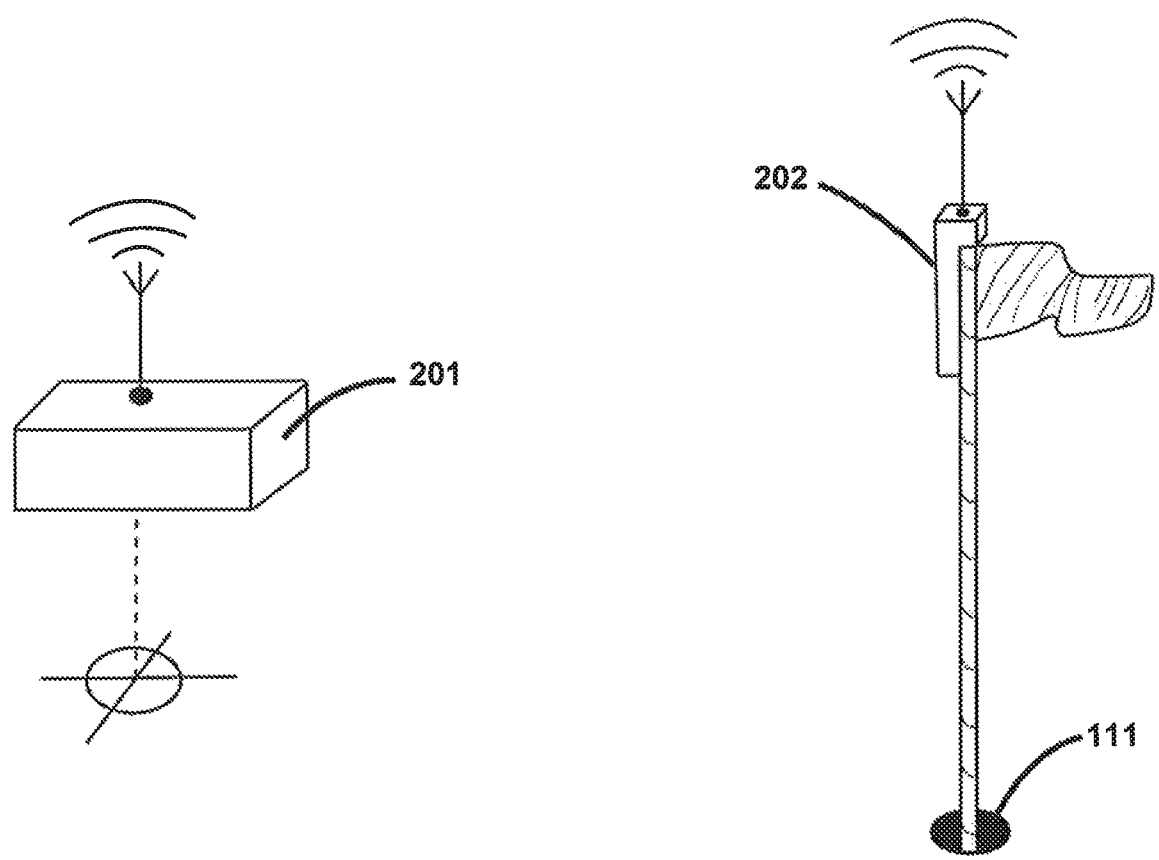
FIG. 2 illustrates an embodiment of a master unit and an embodiment of a flag comprising a slave unit.

FIG. 2 illustrates general invention embodiments of a master unit 201 and of a slave unit 202.

The master unit 201 includes a processing unit, a GPS receiver, and a memory pre-configured with the fixed coordinates of the GPS receiver. The GPS receiver could instead be a receiver for any other satellite navigation system. The operation of the master unit 201 requires its memory to be configured with the fixed coordinates of the GPS receiver. Afterwards, these coordinates are used as a reference to compare coordinates determined by the GPS receiver.

The master unit 201 also includes a communication interface for communicating through the Internet. The connection may be performed by wire, for example via Ethernet, or wirelessly, for example via WiFi or via a digital cellular network.

The slave unit 202 is illustrated as being installed on a flag for marking the position of the hole 111 on the golf course. This arrangement is useful because it can be used to determine the position of the hole 111 with a few changes of the already existing elements of on the golf course.

Figure 3:
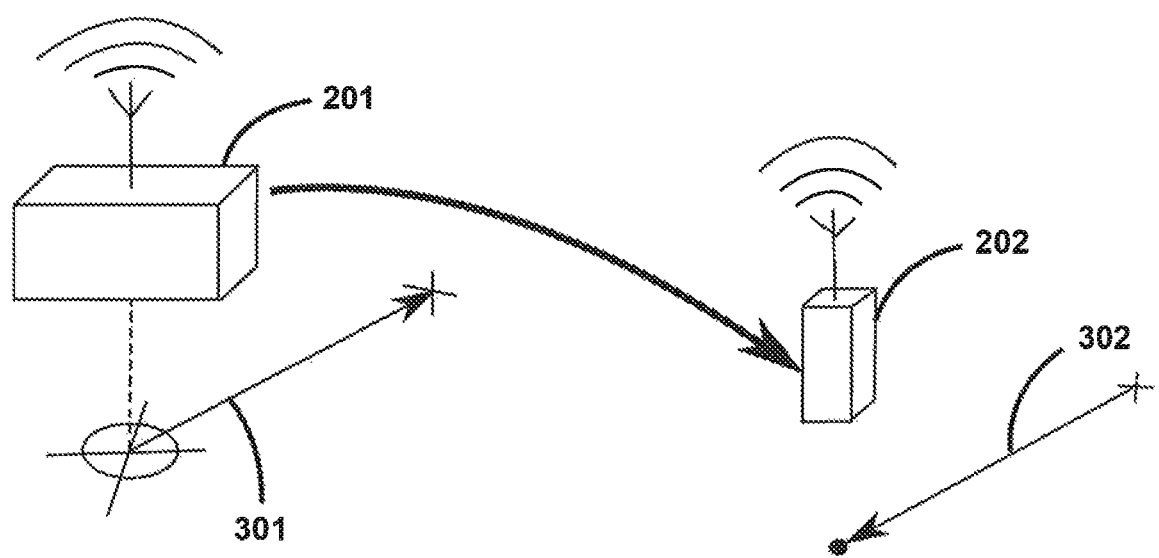
FIG. 3 illustrates how a slave unit may improve its determination of a position on the golf course.

FIG. 3 illustrates a system invention embodiment showing how a displacement 301 is processed by the master unit 201 and propagated to a slave unit 202, which then uses it to improve the position determined by the receiver of the slave unit 202.

For this example, the system comprises a server (not shown) remotely assessible through the Internet. Initially, the memory of the master unit 201 is configured with the fixed position at which the receiver of the master unit 201 is operating. This may be done by any prior art method for that purpose, such as by reading the coordinates of the fixed position using a map or by collecting position samples from the receiver of the master unit 201 during several days and, at the end, processing a statistical indicator for representing the fixed position.

After the initial configuration of the memory of the master unit 201, the following occurs. The master unit 201 obtains a position determined by its receiver and processes the displacement 301 by comparing the obtained position and the fixed position configured in its memory. In this respect, the master unit 201 processes the difference of latitude and longitude between the obtained position and the fixed position, which is represented by the arrow 301 in the figure. Once the displacement 301 has been processed, the master unit 201 may then communicate the processed displacement 301 to the server, for example via a wired connection to Internet. The server stores the displacement 301 data in its database. Thus, the master unit 201 makes the displacement 301 available to the slave unit 202, which can then communicate with the server to obtain it.

The slave unit 202 communicates with the server through the Internet, for example via a wireless connection, and obtains the displacement 301. Then, the slave unit 202 obtains a position determined by its receiver. This position is then filtered based on the obtained displacement 301. In particular, the slave unit 202 corrects the obtained position based on an inversion of the difference of latitude and longitude processed by the master unit 201, ie the inverted displacement 302. Thus, the slave unit 202 processes a filtered position using the inverted displacement 302.

It will be appreciated that the inverted displacement 302 may be processed by some other component of the system, for example by the server or by the master unit 201 before communicating it to the server.

This system invention embodiment allows improving the determination of a position at the slave unit 202. Thus, the slave unit 202 may be installed on an autonomous vehicle, which would use the position determined by the embodiment as an input to its navigation system. As described for FIG. 2 and illustrated in FIG. 4, the slave unit 202 may also be installed on a flag for marking the position of a hole on a golf course.

Figure 4:
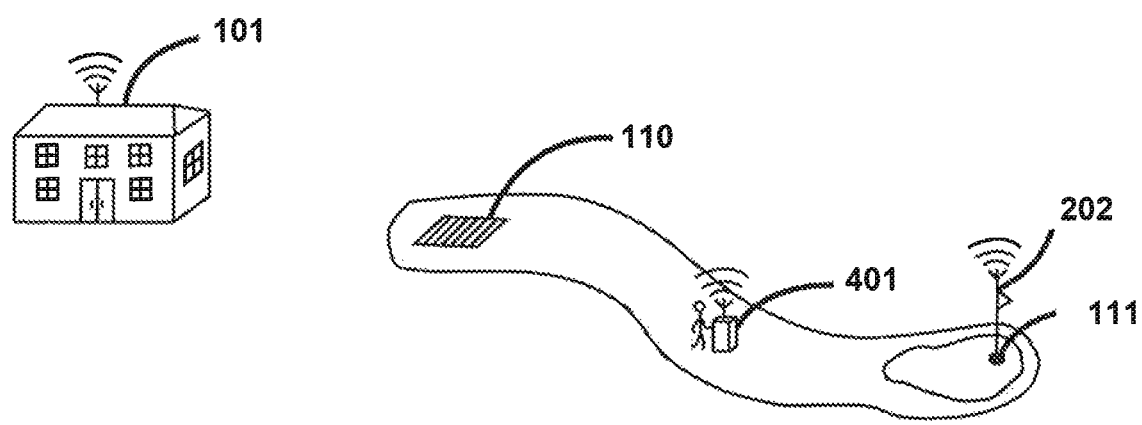
FIG. 4 illustrates a golf player measuring the distance to a flag.

FIG. 4 illustrates how a system invention embodiment may be installed and used on a golf course, so that a golf player is able to determine the distance from his/her position to the hole 111. In this example, the clubhouse 101 is chosen as the location where the master unit 201 is installed however any other location in the golf course could have been chosen. Further, the example includes two slave units: a slave unit 202 installed on the flag of the hole 111, as illustrated in FIG. 2; and another slave unit 401 being carried by the golf player.

After the slave unit 202 has processed its filtered position in a similar manner as explained for FIG. 3, it then communicates this result to the server through the internet, which stores the result in its database. This arrangement may allow for the server to store filtered positions from several slave units in a centralised manner.

After having performed the tee-off stroke, ie the initial stroke performed from the teeing ground 110, the golf player now has to perform his/her next stroke from the fairway, ie the part of the golf course between the teeing ground 110 and the smooth area of short grass surrounding the hole 111 (known as the putting green). An important information for the golf player to consider when deciding on how to perform the next stroke is the distance from his/her current position to the hole 111.

A stroke is a movement of the club made with the intention of striking at and moving the ball. A player may decide on several aspects when performing the stroke. The following are a few examples. There are various kinds of clubs (eg wood, iron, or putter) that the player can choose from and each kind has different features to consider (eg the length of the shaft or the angle of inclination of its face). Another aspect to decide upon is the movement to be performed, for example a full swing, a three-quarter swing, or any other kind of swing. A further aspect is the position where the ball is struck at. Any aspect considered for the stroke will influence the way the golf player transmits energy to the ball.

In order to determine the distance, the golf player enables the slave unit 401 to operate as follows. The slave unit 401 determines its filtered position in a similar manner as the slave unit 202 did: obtain the displacement processed by the master unit 101 from the server; obtain the position determined by its receiver; and filter the obtain position based on the obtained displacement. Then, it obtains the filtered position of the intended target, which is slave unit 202. In particular, the slave unit 401 communicates with the server to obtain this information. And then it calculates the distance between the two filtered positions.

This solution allows to solve a problem that is observed nowadays. In order to save the putting green surrounding a hole, many golf courses are managed so that the wear due to the golf player stepping on it is minimised. One strategy in particular, is to regularly move the hole and flag on the putting green. This may be achieved by removing the components of the hole, typically a cup with the appropriate dimensions, filling in the cavity left behind and covering it with pre-grown grass, and then inserting the components of the hole in another location of the putting green. This has the advantage for the owners of the golf course that the wear of the putting green is spread throughout in an homogenous manner. However, this strategy also has the consequence that the hole will be changing position regularly within a significant area, typically with 500 square meters. Consequently, many prior art solutions using a centralised database with positions of holes will provide an error of several meters when estimating the distance between an initial position on the golf course and a hole, independently of the accuracy of the initial position on the golf course. The present invention, and in particular the example explained with reference to FIG. 4, allows solving this problem.

Invention embodiments may have some or all of the following advantages:
- Although the master unit has to be at a fixed location in order to process the displacement, any slave unit may move on the golf course
- A golf player may use the system to measure a distance to a target without requiring direct line of sight with the target
- The quality of a measurement of a distance to a target does not depend on the reflectivity or any other physical property of the target
- The slave unit being carried by a player does not need to be manoeuvred steadily; the player's hands may shake and that will not interfere significantly with the determination of a position
- The system is used in the same manner to measure the distance to any target, independently of the starting position; measuring a distance from the teeing ground is as easy as measuring a distance from the fairway
- The location of the holes of the golf course may be changed over time without requiring additional work to measure their coordinates: a flag, comprising a slave unit, may be simply moved to a new location and it will automatically update its coordinates
- An overall improvement of the accuracy determining a position in the vicinity of the master unit Generally, the terms used in this description and claims are interpreted according to their ordinary meaning the technical field, unless explicitly defined otherwise. Notwithstanding, the terms "comprises" and "comprising" and variations thereof mean that the specified features, steps or integers are included. These terms are not interpreted to exclude the presence of other features, steps or integers. Furthermore, the indefinite article "a" or "an" is interpreted openly as introducing at least one instance of an entity, unless explicitly stated otherwise. An entity introduced by an indefinite article is not excluded from being interpreted as a plurality of the entity.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the embodiments described above, many equivalent modifications and variations will be apparent to those skilled in the art when given this disclosure. Accordingly, the embodiments of the invention set forth above are considered to be illustrative and not limiting. Various changes to the described embodiments may be made without departing from the spirit and scope of the invention.

The invention claimed is:

1. A system for determining a position on a golf course, the system comprising:
   a master unit, first and second slave units, and a server adapted to communicate through a telecommunications network, wherein each of the master unit and the first and second slave units comprises a processing unit, a memory, a receiver for a satellite navigation system, and is adapted to communicate through the telecommunications network, wherein at least one of the first and second slave units comprises an autonomous vehicle, and wherein at least one of the first and second slave units comprises a flag for marking a position of a hole on the golf course;
   wherein the server comprises a database for storing a difference processed by the master unit and also for storing at least one corrected position of at least one of the first and second slave units;
   wherein the receiver of the master unit is operable at a fixed position on the golf course and the memory of the master unit is configured with the fixed position;
   wherein the master unit is configured to:
      obtain a position determined by the receiver of the master unit;
      process the difference between the obtained position and the fixed position; and
      make the processed difference accessible to the first and second slave units by communicating the processed difference to the server through the telecommunications network, and
   wherein the first slave unit is configured to:
      obtain the difference processed by the master unit by communicating with the server through the telecommunications network so as to obtain the processed difference;
      obtain a position determined by the receiver of the first slave unit;
      correct the obtained position of the first slave unit based on the processed difference of the master unit; and
      communicate the corrected position through the telecommunications network to the server;
   wherein the server is configured to:
      store the processed difference from the master unit in the database; and
      store the corrected position from the first slave unit in the database; and
   wherein the second slave unit is configured to:
      obtain a position determined by the receiver of the second slave unit;
      communicate with the server through the telecommunications network so as to obtain the processed difference of the master unit stored in the database and the corrected position of the first slave unit stored in the database;
      correct the obtained position of the second slave unit based on the processed difference of the master unit; and
      calculate a distance between the corrected position of the second slave unit and the corrected position of the first slave unit.

2. The system according to claim 1, wherein the master unit processes the difference between the obtained position and the fixed position by processing a difference of latitude and longitude between the obtained position and the fixed position.

3. The system according to claim 2, wherein the first slave unit is configured to correct the obtained position based on an inversion of a difference of latitude and longitude processed by the master unit.

4. The system according to claim 1, wherein at least one of the first and second slave devices comprises a portable device.

5. The system according to claim 1, wherein the autonomous vehicle comprises a lawn mower.

6. A golf course comprising:
   a system for determining a position on a golf course, the system comprising:
   a master unit, first and second slave units, and a server adapted to communicate through a telecommunications network, wherein each of the master unit and the first and second slave units comprises a processing unit, a memory, a receiver for a satellite navigation system, and is adapted to communicate through the telecommunications network, wherein at least one of the first and second slave units comprises an autonomous vehicle, and wherein at least one of the first and second slave units comprises a flag for marking a position of a hole on the golf course;
   wherein the server comprises a database for storing a difference processed by the master unit and also for storing at least one corrected position of at least one of the first and second slave units;
   wherein the receiver of the master unit is operable at a fixed position on the golf course and the memory of the master unit is configured with the fixed position;
   wherein the master unit is configured to:
      obtain a position determined by the receiver of the master unit;
      process the difference between the obtained position and the fixed position; and
      make the processed difference accessible to the first and second slave units by communicating the processed difference to the server through the telecommunications network;
   wherein the first slave unit is configured to:
      obtain the difference processed by the master unit by communicating with the server through the telecommunications network so as to obtain the processed difference;
      obtain a position determined by the receiver of the first slave unit;
      correct the obtained position of the first slave unit based on the processed difference of the master unit; and
      communicate the corrected position through the telecommunications network to the server;
   wherein the server is configured to:
      store the processed difference from the master unit in the database; and
      store the corrected position from the first slave unit in the database; and
   wherein the second slave unit is configured to:
      obtain a position determined by the receiver of the second slave unit;
      communicate with the server through the telecommunications network so as to obtain the processed difference of the master unit stored in the database and the corrected position of the first slave unit stored in the database;
      correct the obtained position of the second slave unit based on the processed difference of the master unit; and calculate a distance between the corrected position of the second slave unit and the corrected position of the first slave unit.

\* \* \* \* \*